Nov. 26, 1968 T. J. WISSING ET AL 3,413,013
VEHICLE SAFETY ASSEMBLY
Filed March 10, 1967
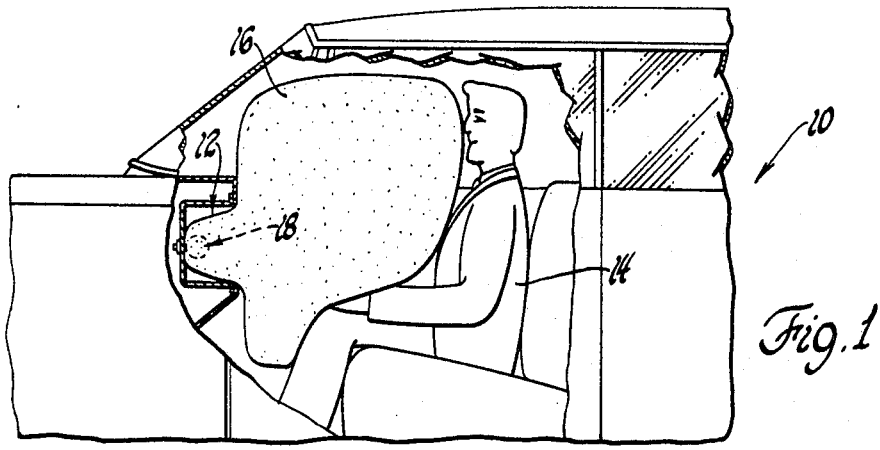
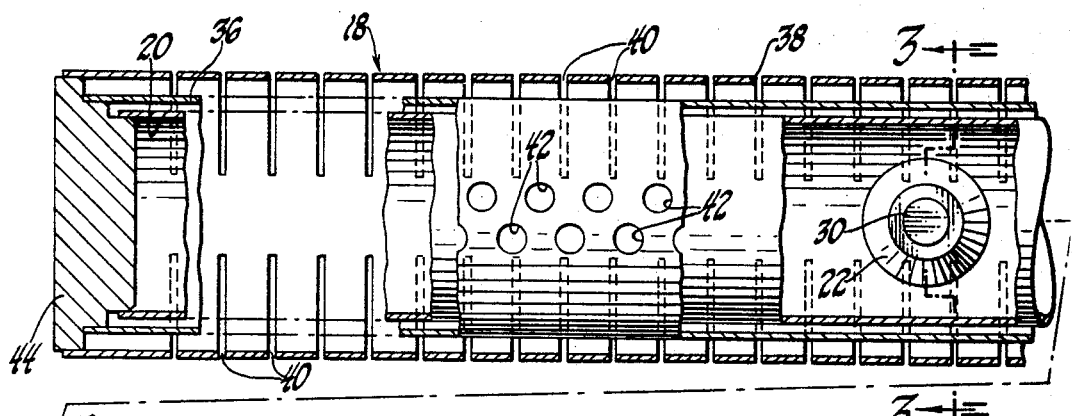
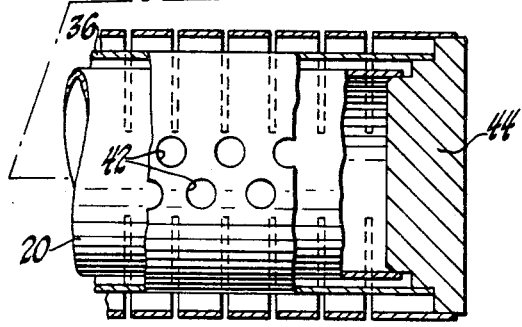
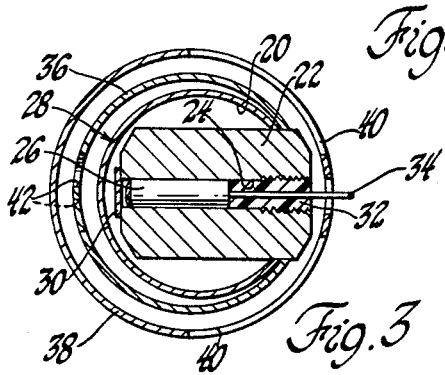
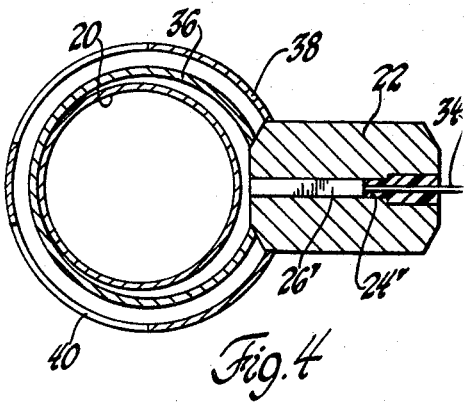
INVENTORS,
THOMAS J. WISSING,
SIDNEY OLDBERG,
WILLIAM R. CAREY
BY
Barnard, McGlynn & Leising
ATTORNEYS

United States Patent Office 3,413,013
Patented Nov. 26, 1968

3,413,013
VEHICLE SAFETY ASSEMBLY
Thomas J. Wissing, Southfield, Sidney Oldberg, Birmingham, and William R. Carey, Farmington, Mich., assignors to Eaton Yale & Towne, Inc., Cleveland, Ohio, a corporation of Ohio
Filed Mar. 10, 1967, Ser. No. 622,349
9 Claims. (Cl. 280—150)

ABSTRACT OF THE DISCLOSURE

A safety assembly adapted to be attached to a vehicle for protecting an occupant thereof and including an inflatable bag, a container in communication with the bag to store fluid for inflating the bag, and a receptacle defining a chamber in which an explosive charge is disposed. The receptacle is associated with the container and is adapted for confining and directing the energy resulting from the activation of the explosive charge to a predetermined area of the container thereby to open the container and inflate the bag.

---

Recently, a great deal of research and development has occurred in an effort to develop safety systems for vehicles, particularly safety systems for passenger vehicles such as automobiles. One safety system which is being thoroughly investigated is one utilizing an inflatable bag which is automatically inflated in response to a predetermined condition of the automobile to prevent the occupant of the automobile from contacting the instrument panel, windshield, or the like. In other words, the bag is inflated during a crash to prevent the occupant of the automobile from incurring serious injuries as a result of impact with the interior of the vehicle body.

The time in which the bag must be inflated is very critical and is measured in terms of milliseconds. Consequently, one of the problems being thoroughly researched is that relating to a means for rapidly inflating the bag. One such means which has proven satisfactory is an elongated cylindrical container for storing presurized fluid and including an explosive charge disposed within the container whereby upon activation of the explosive charge, the container is open to exhaust pressurized fluid into the bag for inflating the bag.

Heretofore, the container frequently included a stress riser, such as a groove extending therealong, for predetermining the area at which the container is opened as a result of activating the explosive charge. In other words, a groove or another appropriate area of stress deviation extends longitudinally along the outer circumference of the container so that upon activation of the explosive charge, the container ruptures or breaks open along such a groove. The container, however, must have a minimum wall thickness which is commensurate with the amount of fluid pressure to be contained therein and therefore the thickness of the container at the point having the groove must be of that minimum thickness. Therefore, the material of the container, which provides a wall thickness greater than the thickness at the point of the groove, is not necessary for strength. It is only required to define a groove or weakened portion for predetermining the area of the opening resulting from activation of the explosive charge.

It has been discovered that even without utilizing a stress riser, i.e., a weakened portion in the container, a cylindrical container will rupture or open along a line directed longitudinally therealong when an explosive means is disposed within the container and activated. However, there is no way of predetermining the position or the area of opening of such a container upon activation of the explosive charge within the container. In addition, the explosive means disposed within the container releases energy in all directions when activated and therefore an explosive means of ample magnitude must be utilized to assure that the container opens. To overcome these problems, some prior art devices have utilized a linear shaped explosive charge which is disposed on the container and concentrates or directs the enery resulting from the detonation thereof along a line on the container for opening the container. Such a charge is very satisfactory for most environments. However, such explosive charges are sometimes disadvantageous because they must be specifically shaped. In addition, such shaped charges normally produce small solid fragments upon detonation and these fragments can puncture the inflatable bag. Also, and perhaps most importantly, such explosive charges must be disposed on the pressure container before assembly of the pressure container with other components of the assembly.

Accordingly, it is an object and feature of this invention to provide a container adapted to be attached to an inflatable bag for providing a safety system wherein the container is combined with a receptacle means to receive an explosive means after the container has been assembled with other components and for confining and directing the energy resulting from the detonation thereof to a predetermined portion of the container for opening the container.

Another object and feature of this invention is to provide container means adapted to be attached to an inflatable bag to provide a safety system for a vehicle wherein the container means has a minimum constant wall thickness and includes receptacle means for receiving an explosive means of minimum magnitude to confine and direct the energy resulting from the activation of the explosive means to a predetermined area of the container means for opening the container means at the predetermined area.

In general, these and other objects and features of this invention may be attained in a preferred embodiment including a source of fluid in communication with an inflatable bag. The source of fluid includes an inner cylindrical container for storing fluid and a receptacle means extending into the interior of the inner cylindrical container and defining a chamber for receiving and supporting an explosive means. The chamber is in communication with the exterior of the inner container and a sealing means is disposed on the receptacle means for isolating the chamber thereof from the interior of the container means until the explosive means is activated. The receptacle means has sufficient strength as a result of a relatively large wall thickness to confine and direct the energy resulting from the activation of the explosive means so that the energy resulting from the activation of the explosive means removes the sealing means and is directed to a predetermined area of the container means for causing the container means to open as a result of rupturing, ripping, breaking, or the like. There is also included a limiting means surrounding the inner container for controlling the opening of the inner container when the explosive means is activated. Additionally, a flow control means comprising an outer cylindrical member is disposed about the limiting means and the inner container for controlling the fluid flow from the inner container when it is opened to prevent the inadvertent rupture of the bag.

Other objects and attendant advantages of the present invention will be readily appreciated as the same becomes better understood by reference to the following detailed description when considered in connection with the accompanying drawings wherein:

FIGURE 1 is a partially broken away fragmentary view of the assembly of the instant invention;

FIGURE 2 is an enlarged cross-sectional view of the pressure source utilized in the assembly of the instant invention;

FIGURE 3 is a cross-sectional view taken substantially along line 3—3 of FIGURE 2; and FIGURE 4 is a fragmentary cross-sectional view similar to FIGURE 3 and showing an alternative embodiment.

Referring now to the drawings, wherein like numerals indicate like or corresponding parts throughout the several views, a vehicle is generally shown at 10 in combination with a safety assembly generally shown at 12 for protecting the occupant 14 of the vehicle.

The assembly includes an inflatable bag 16 and a fluid source, generally shown at 18. The fluid source 18 inflates the bag 16. The bag 16 is normally stored in a collapsed folded position and an appropriate sensing means is utilized to inflate the bag 16 in the event of a crash or any other predetermined operating condition of the vehicle so as to prevent the occupant 14 from moving forward and impacting portions of the vehicle, such as the instrument panel and/or windshield.

The fluid source 18 includes a container means comprising the inner cylinder container 20 and a housing or receptacle means 22. The inner cylindrical container 20 is in communication with the bag 16 and stores pressurized fluid for inflating the bag 16. The receptacle means 22 defines a chamber 24 to receive an explosive material or means 26. The chamber 24 is circular in cross section. The receptacle means 22 is associated with the inner container 20 and directs the energy resulting from the activation of the explosion means 26 to a predetermined area, generally indicated at 28, of the inner container 20 thereby to open the inner container 20 at the predetermined area 28 for inflating the bag 16. In other words, the receptacle means 22 functions like a gun barrel or a cannon barrel to confine and direct the energy resulting from the activation of the explosive means 26 toward the area 28 of the inner container 20 thereby to open the inner container 20 at the area 28.

The receptacle means 22 extends radially into the inner container 20 in a direction which is substantially transverse to the longitudinal axis of the inner container 20. The chamber 24 extends through the receptacle means 22 and is in communication with the exterior of the inner container 20. The chamber 24 would normally be in communication with the interior of the inner container 20 except for the sealing means 30. The sealing means 30 comprises a plate, plug, or the like, welded or adhesively secured to the receptacle means 22 for isolating the chamber 24 from the interior of the inner container 20 until the explosive means 26 is activated. It has been discovered that if the explosive means 26 is exposed to the fluid pressure within the container 20, the reliability of the detonation of the explosive means 26 is significantly reduced. Thus, the sealing means 30 prevents the explosive means 26 from being subjected to the fluid pressure within the inner container 20. Upon the activation of the explosive means 26, however, the sealing means is removed. In other words, the sealing means 30 may be a frangible member, a burstable diaphragm, or any other appropriate means. The explosive means 26 includes a threaded plug portion 32 which threadedly engages the receptacle means 22 for securing the explosive means 26 in the chamber 24 of the receptacle means 22. An electrical lead 34 extends from the explosive means 26 and is attached to appropriate sensing means for supplying a current for activating or detonating the explosive means 26. The explosive means 26 is a high energy pyrotechnic or the like. One found satisfactory is that normally referred to as a squib.

There is also included a limiting means comprising the intermediate member 36 for controlling the opening of the inner container 20 when the explosive means 26 is activated. In other words, upon the activation of the explosive means 26, the energy thereof is confined and directed by the receptacle means 22 to the predetermined area 28 of the inner container 20 thereby to open the inner container 20 in the area 28. The inner cylindrical container 20 will begin to open longitudinally along its circumference in the predetermined area 28. In so opening, the portions of the inner container 20 on either side of the opening will move radially outwardly and into contact with the intermediate container 26. Once these portions of the inner container 20 contact the intermediate member 26, they are prevented from moving any further in a radially outward direction. Since the opening of the container 20 begins midway of its length and the intermediate member 26 limits outward movement thereof, the force resulting from the explosive means is expended by opening the container 20 substantially from end to end. Because of the limiting function of the intermediate member 26, therefore, the opening of the inner container 20 extends substantially along its entire length. In other words, if the intermediate member 36 were not provided, the activation of the explosive means 26 could result in merely providing a very large hole only in the area of the inner container 20 substantially opposite the receptacle means 22; that is, an opening which would not extend substantially longitudinally from one end of the inner container 20 to the other.

There is also included a flow control means comprising the outer cylindrical member 38 which is disposed in spaced relationship to the intermediate member 36 and the inner container 20 for controlling the fluid flow from the inner container 20 to prevent the inadvertent rupture of the bag 16. The outer cylindrical member has a plurality of outlet openings 40 spaced longitudinally therealong. The outlet openings 40 are also circumferentially spaced from the predetermined area 28 where the container 20 is opened as a result of the activation of the explosive means 26. The intermediate cylindrical member 36 is disposed in spaced relationship with the outer cylindrical member 38 to define a flow path therebetween and the intermediate member 36 has a plurality of openings 42 for allowing fluid to flow from the inner container 20 upon being opened longitudinally therealong. The openings 42 are circumferentially aligned with the predetermined area 28 in the inner container 20. Plug means 44 defines the ends of the inner container 20 and the cylindrical members 36 and 38. If the outer member 38 were not provided, the fluid under pressure would be ejected from the openings 42 in the intermediate member 36 and could form a jet having sufficient length and/or energy to rupture the bag 16. However, by providing the outer member 38, the flow of fluid from the openings 42 moves about the intermediate member 36 and out the openings 40 in the outer member 38. The specific configuration and disposition of the outlet openings 40 are significant and are disclosed and claimed in copending application Ser. No. 621,845 filed on Mar. 9, 1967 and assigned to the assignee of the instant invention.

The assembly of the instant invention may be disposed in combination with a vehicle 10 as illustrated in FIGURE 1 with the inner container 20 charged with pressurized fluid through an appropriate valving device (not shown) communicating with the interior of the inner container 20. The explosive means 26 is disposed in the receptacle 22 and the lead 34 thereof is attached to an appropriate sensing means. Any suitable sensing device may be utilized, such as an eccelerometer, inertia responsive switch, or the like. An example switch is illustrated in copending application Ser. No. 562,289, filed July 1, 1966 in the names of Sidney Oldberg and William R. Carey and assigned to the assignee of the instant invention. In the event of a crash of the vehicle, the sensing means sends a signal through the lead 34 to the explosive means 26. The explosive means 26 is activated or detonated and the energy resulting therefrom is confined and directed by the receptacle means 22 against the sealing means 30 which is removed or ruptured so that the concentrated energy of the explosive means 26 is directed against the predetermined area 28 of the inner container 20 thereby to open the inner container 20 in the predetermined area 28. The alternative embodiment illustrated in FIGURE 4 uses the same components as the previously described embodiment, i.e., the inner cylindrical container 20, the intermediate cylindrical member 36, the outer cylindrical member 38, and the receptacle means 22. The alternative embodiment illustrated in FIGURE 4 differs from the embodiment previously described in that the receptacle means 22 is disposed outwardly of the inner cylindrical member 20. Since the receptacle means 22 does not extend into the inner cylindrical container 20 in the embodiment illustrated in FIGURE 4, there is no requirement for a pressure tight seal about the receptacle means 22. In other words, in the embodiment illustrated in FIGURES 1 through 3, the connection of the inner container 20 to the receptacle 22 must be fluid tight so that the pressurized fluid within the inner container 20 does not leak past the abutment between the inner container 20 and the receptacle means 22. Likewise, in the embodiment illustrated in FIGURE 4, there is no need for a sealing cap as shown at 30 in FIGURES 1 through 3. In addition, the receptacle 22, as illustrated in FIGURE 4, defines a chamber 24' which is rectangular or elongated in cross section as compared to the circular cross section of the chamber 24 in the embodiment of FIGURES 1 through 3. By elongating the chamber 24' in a direction longitudinally of the inner container 20, the receptacle means 22 of FIGURE 4 confines and directs the energy resulting from the detonation of the explosive charge 26' to a predetermined area which extends longitudinally along the container 20. The explosive charge 26' may be of any convenient configuration but is preferably also elongated in a direction longitudinally of the inner container 20 to match the cross-sectional configuration of the bore 24'. The explosive charge 26' when having such an elongated cross section may be secured within the receptacle by an appropriate adhesive or by attaching a retainer means to the outer end of the receptacle means 22. Thus, by detonating the explosive charge 26', the energy resulting therefrom is confined within the chamber 24' and thereby directed to a predtermined elongated area on the outside of the container 20, thereby opening the container 20. As the container 20 is opened, the portions thereof on either side of the opening are forced radially outwardly and into engagement with the intermediate member 36 because of the pressure within the container 20. In the embodiment of FIGURE 4, the intermediate container 36 has holes therein on either side of the receptacle means 22 for allowing the fluid from the container 20 to flow therethrough and about the intermediate member 36 and through the outlet openings 40.

Thus, the instant invention provides an assembly which utilizes an inner container 20 having a minimum wall thickness since it need not utilize a stress riser. In addition, because of the use of the receptacle 22, the container 20 may utilize an explosive means 26 of smaller magnitude since its energy is confined and directed to a predetermined area of the inner container for opening the inner container in the predetermined area. Furthermore, the explosive charge 36 may be inserted after the container 20, the intermediate member 36 and the outer member 38 have been assembled. Although the instant invention overcomes the need for a stress riser, it will be appreciated that a stress riser may be utilized. Furthermore, the receptacle means 22 may be utilized to open a container having a greater wall thickness than could be opened utilizing an explosive means of the same magnitude without having its energy confined and directed as accomplished by the receptacle means 22. The inner container 20, the intermediate member 36, and the outer mmeber 38 are all preferably made of metal and the receptacle means 22 is preferably made of a high impact strength steel.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly adapted to be attached to a vehicle for protecting an occupant thereof, said assembly comprising; an inflatable bag, container means in communication with said bag to store fluid for inflating said bag, receptacle means to receive an explosive means and associated with said container means for confining and directing the energy resulting from the activation of the explosive means to a predetermined portion of the area of said container means thereby to open said container means and inflate said bag, said receptacle means extending into the interior of said container means, said receptacle means having a chamber extending therethrough for receiving and supporting the explosive means, said chamber being in communication with the exterior of said container means, sealing means isolating said chamber from the interior of said container means until the explosive means is inserted and activated, said receptacle means having sufficient strength to confine the energy resulting from the activation of the explosive means to said chamber so that the energy removes said sealing means and is directed to the predetermined area of said container means, said container means being substantially cylindrical and said receptacle means extending radially thereinto in a direction substantially transverse to the longitudinal axis thereof, said container means comprising an inner container for receiving and storing fluid, and limiting means associated with said inner container for controlling the opening of said inner container when the explosive means is disposed in said receptacle means and activated, flow control means disposed in spaced relationship to said limiting means and said inner container for controlling fluid flow from said inner container to prevent the inadvertent rupture of said bag, said flow control means comprising an outer cylindrical member having a plurality of outlet openings spaced longitudinally therealong, said outlet openings being circumferentially spaced from said predetermined area where said inner container is to be opened, said limiting means comprising an intermediate cylindrical member disposed within and in spaced relationship to said outer cylindrical member to define a flow path therebetween, said intermediate cylindrical member having at least one opening for allowing fluid to flow therefrom longitudinally therealong, said opening in said intermediate member being circumferentially aligned with said predetermined area in said inner container, and plug means defining the ends of said inner container and said cylindrical members.

2. An assembly adapted to be attached to a vehicle for protecting an occupant thereof, said assembly comprising an inflatable confinement, container means in communication with said confinement to store fluid for inflation of said confinement, receptacle means to receive explosive means and associated with said container means for confining and directing the energy resulting from the activation of the explosive means to a predetermined portion of the area of said container means thereby to open said container means and inflate said confinement, explosive means located in said receptacle means, said receptacle means having a chamber extending therethrough for receiving and supporting the explosive means, said receptacle means having sufficient strength to confine the energy resulting from the activation of the explosive means in said chamber so that the energy is directed to the predetermined area of said container means, said container means comprising an inner container for receiving and storing fluid, limiting means associated with said inner container for controlling the opening of said inner container when the explosive means is disposed in said receptacle means and activated, flow control means disposed in spaced relationship to said limiting means and said inner container for controlling fluid flow from said inner container to prevent the inadvertent rupture of said confinement, said flow control means comprising an outer member having at least one outlet opening therein, said limiting means comprising an intermediate member disposed within and in spaced relationship to said outer member to define a flow path therebetween, said intermediate member having at least one opening for allowing fluid to flow therefrom.

3. An assembly as defined in claim 2 further including means for supporting said members and said inner container in said spaced relationship relative to each other.

4. An assembly as defined in claim 2 wherein said container means is an elongate member and said receptacle means extends in a direction substantially transverse to the longitudinal axis thereof.

5. An assembly as defined in claim 2 wherein said receptacle means has a bore therein in which said explosive means is located and which bore faces said container, said explosive means being a gas generating explosive which when activated generates high velocity gases which impact the container.

6. Apparatus for minimizing injury to occupants of a vehicle during a collision, said apparatus comprising an inflatable confinement located within an occupant compartment of the vehicle and having a first deflated condition and a second inflated condition, a closed container for storing fluid, said container being in fluid communicating relationship with said confinement, and a non-rupturable housing having a bore therein, said bore originating on a surface of the housing, the housing being positioned adjacent said container with said bore facing said container, and a gas generating explosive material located in said bore and upon activation generating high velocity gases which impact the container with sufficient force to cause the formation of an opening therein and allow the escape of fluid into the confinement to effect actuation of said confinement from said first deflated condition to said second inflated condition.

7. Apparatus as defined in claim 6 wherein said container has a longitudinal axis and said bore extends substantially perpendicular thereto.

8. Apparatus as defined in claim 6 wherein said housing extends into the interior of said container and said bore faces an inner surface of said container.

9. Apparatus as defined in claim 6 wherein said housing is located exteriorly of said container and said bore faces an outer surface of said container.

References Cited

UNITED STATES PATENTS

| | | | |
|---|---|---|---|
| 2,834,606 | 5/1958 | Bertrand | 280—150 |
| 2,850,291 | 9/1958 | Ziccardi | 280—150 |
| 3,185,089 | 5/1965 | Parkhurst et al. | 102—24 |
| 3,191,533 | 6/1965 | Hopson | 102—24 |
| 3,197,234 | 7/1965 | Bertrand | 280—150 |

BENJAMIN HERSH, *Primary Examiner.*

J. SIEGEL, *Assistant Examiner.*